(12) United States Patent
Bradfield

(10) Patent No.: US 8,614,538 B2
(45) Date of Patent: Dec. 24, 2013

(54) ELECTRIC MACHINE COOLING SYSTEM AND METHOD

(75) Inventor: Michael D. Bradfield, Anderson, IN (US)

(73) Assignee: Remy Technologies, LLC, Pendleton, IN (US)

(*) Notice: Subject to any disclaimer, the term of this patent is extended or adjusted under 35 U.S.C. 154(b) by 140 days.

(21) Appl. No.: 12/815,266

(22) Filed: Jun. 14, 2010

(65) Prior Publication Data

US 2011/0304226 A1 Dec. 15, 2011

(51) Int. Cl.
*H02K 9/00* (2006.01)

(52) U.S. Cl.
USPC .................. 310/407; 310/54; 310/57

(58) Field of Classification Search
USPC ............. 310/52, 54, 57–59, 64, 89, 400, 406, 310/407, 411
See application file for complete search history.

(56) References Cited

U.S. PATENT DOCUMENTS

| | | | |
|---|---|---|---|
| 2,080,678 A | 5/1937 | Van Horn et al. | |
| 2,264,616 A | 12/1941 | Buckbee | |
| 2,545,335 A * | 3/1951 | Becker | 310/52 |
| 3,447,002 A | 5/1969 | Ronnevig | |
| 3,525,001 A | 8/1970 | Erickson | |
| 3,748,507 A | 7/1973 | Sieber | |
| 4,038,570 A | 7/1977 | Durley, III | |
| 5,081,382 A | 1/1992 | Collings et al. | |
| 5,180,004 A | 1/1993 | Nguyen | |
| 5,207,121 A | 5/1993 | Bien | |
| 5,293,089 A | 3/1994 | Frister | |
| 5,372,213 A | 12/1994 | Hasebe et al. | |
| 5,448,118 A * | 9/1995 | Nakamura et al. | 310/54 |
| 5,519,269 A | 5/1996 | Lindberg | |
| 5,616,973 A | 4/1997 | Khazanov | |
| 5,859,482 A | 1/1999 | Crowell et al. | |
| 5,923,108 A | 7/1999 | Matake et al. | |
| 5,937,817 A | 8/1999 | Schanz et al. | |
| 5,965,965 A | 10/1999 | Umeda et al. | |
| 6,011,332 A | 1/2000 | Umeda et al. | |
| 6,069,424 A | 5/2000 | Colello et al. | |
| 6,075,304 A | 6/2000 | Nakatsuka | |
| 6,087,746 A | 7/2000 | Couvert | |

(Continued)

FOREIGN PATENT DOCUMENTS

| | | |
|---|---|---|
| JP | 05-103445 A | 4/1993 |
| JP | 05-292704 A | 11/1993 |

(Continued)

OTHER PUBLICATIONS

International Search Report, mailed Jul. 31, 2012.

(Continued)

*Primary Examiner* — Dang Le
(74) *Attorney, Agent, or Firm* — Greenberg Traurig LLP

(57) ABSTRACT

Embodiments of the invention provide an electric machine module and a method for cooling an electric machine. The electric machine module contains an electric machine including a stator with stator end turns and a housing with at least two removably-coupled frame members. Each of the at least two removably-coupled frame members include an inner wall, an outer wall, and a coolant cavity defined between the inner wall and the outer wall. The coolant cavity can be positioned substantially around one of the stator end turns radially and substantially beside the one stator end turn axially.

17 Claims, 6 Drawing Sheets

(56) References Cited

U.S. PATENT DOCUMENTS

| | | |
|---|---|---|
| 6,095,754 A | 8/2000 | Ono |
| 6,097,130 A | 8/2000 | Umeda et al. |
| 6,114,784 A | 9/2000 | Nakano |
| 6,147,430 A | 11/2000 | Kusase et al. |
| 6,147,432 A | 11/2000 | Kusase et al. |
| 6,169,344 B1 * | 1/2001 | Tsuruhara ............... 310/58 |
| 6,173,758 B1 | 1/2001 | Ward et al. |
| 6,181,043 B1 | 1/2001 | Kusase et al. |
| 6,201,321 B1 | 3/2001 | Mosciatti |
| 6,208,060 B1 | 3/2001 | Kusase et al. |
| 6,218,747 B1 * | 4/2001 | Tsuruhara ............... 310/54 |
| 6,232,687 B1 | 5/2001 | Hollenbeck et al. |
| 6,242,836 B1 | 6/2001 | Ishida et al. |
| 6,291,918 B1 | 9/2001 | Umeda et al. |
| 6,300,693 B1 | 10/2001 | Poag et al. |
| 6,313,559 B1 | 11/2001 | Kusase et al. |
| 6,333,573 B1 | 12/2001 | Nakamura |
| 6,335,583 B1 | 1/2002 | Kusase et al. |
| 6,346,758 B1 | 2/2002 | Nakamura |
| 6,359,232 B1 | 3/2002 | Markovitz et al. |
| 6,404,628 B1 | 6/2002 | Nagashima et al. |
| 6,417,592 B2 | 7/2002 | Nakamura et al. |
| 6,459,177 B1 | 10/2002 | Nakamura et al. |
| 6,509,665 B1 | 1/2003 | Nishiyama et al. |
| 6,515,392 B2 | 2/2003 | Ooiwa |
| 6,522,043 B2 | 2/2003 | Masegi |
| 6,559,572 B2 | 5/2003 | Nakamura |
| 6,579,202 B2 | 6/2003 | El-Antably et al. |
| 6,621,186 B2 * | 9/2003 | Kawamura et al. ......... 310/60 R |
| 6,770,999 B2 | 8/2004 | Sakurai |
| 6,897,594 B2 | 5/2005 | Ichikawa et al. |
| 6,903,471 B2 | 6/2005 | Arimitsu et al. |
| 6,998,749 B2 | 2/2006 | Wada et al. |
| 7,002,267 B2 | 2/2006 | Raszkowski et al. |
| 7,026,733 B2 | 4/2006 | Bitsche et al. |
| 7,239,055 B2 | 7/2007 | Burgman et al. |
| 7,276,006 B2 | 10/2007 | Reed et al. |
| 7,284,313 B2 | 10/2007 | Raszkowski et al. |
| 7,339,300 B2 | 3/2008 | Burgman et al. |
| 7,352,091 B2 | 4/2008 | Bradfield |
| 7,402,923 B2 | 7/2008 | Klemen et al. |
| 7,417,344 B2 | 8/2008 | Bradfield |
| 7,508,100 B2 | 3/2009 | Foster |
| 7,538,457 B2 | 5/2009 | Holmes et al. |
| 7,545,060 B2 | 6/2009 | Ward |
| 7,592,045 B2 | 9/2009 | Smith et al. |
| 7,615,903 B2 | 11/2009 | Holmes et al. |
| 7,615,951 B2 | 11/2009 | Son et al. |
| 7,667,359 B2 | 2/2010 | Lee et al. |
| 7,939,975 B2 | 5/2011 | Saga et al. |
| 8,067,865 B2 | 11/2011 | Savant |
| 8,068,327 B2 | 11/2011 | Seifert et al. |
| 2003/0222519 A1 | 12/2003 | Bostwick |
| 2004/0036367 A1 | 2/2004 | Denton et al. |
| 2004/0189110 A1 | 9/2004 | Ide et al. |
| 2004/0195929 A1 | 10/2004 | Oshidari |
| 2005/0023266 A1 | 2/2005 | Ueno et al. |
| 2005/0023909 A1 | 2/2005 | Cromas |
| 2005/0194551 A1 | 9/2005 | Klaussner et al. |
| 2005/0274450 A1 | 12/2005 | Smith et al. |
| 2005/0285456 A1 | 12/2005 | Amagi et al. |
| 2007/0024130 A1 | 2/2007 | Schmidt |
| 2007/0052313 A1 | 3/2007 | Takahashi |
| 2007/0063607 A1 | 3/2007 | Hattori |
| 2007/0145836 A1 | 6/2007 | Bostwick |
| 2007/0149073 A1 | 6/2007 | Klaussner et al. |
| 2007/0216236 A1 | 9/2007 | Ward |
| 2008/0223557 A1 | 9/2008 | Fulton et al. |
| 2009/0121562 A1 | 5/2009 | Yim |
| 2009/0174278 A1 | 7/2009 | Sheaffer et al. |
| 2009/0206687 A1 | 8/2009 | Woody et al. |
| 2010/0026111 A1 | 2/2010 | Monzel |
| 2010/0102649 A1 | 4/2010 | Cherney et al. |
| 2010/0109454 A1 | 5/2010 | Vadillo et al. |
| 2010/0176668 A1 | 7/2010 | Murakami |
| 2011/0050141 A1 | 3/2011 | Yeh et al. |
| 2011/0101700 A1 | 5/2011 | Stiesdal |
| 2011/0109095 A1 | 5/2011 | Stiesdal |

FOREIGN PATENT DOCUMENTS

| | | |
|---|---|---|
| JP | 06-036364 U | 5/1994 |
| JP | 06-311691 A | 11/1994 |
| JP | 07-264810 A | 10/1995 |
| JP | 08-019218 A | 1/1996 |
| JP | 09-046973 A | 2/1997 |
| JP | 09-154257 A | 6/1997 |
| JP | 10-234157 A | 9/1998 |
| JP | 11-132867 A | 5/1999 |
| JP | 11-206063 A | 7/1999 |
| JP | 2000-152563 A | 5/2000 |
| JP | 2000-324757 A | 11/2000 |
| JP | 2000-333409 A | 11/2000 |
| JP | 2001-333559 A | 11/2001 |
| JP | 2002-095217 A | 3/2002 |
| JP | 2002-119019 A | 4/2002 |
| JP | 2003-250247 A | 9/2003 |
| JP | 2003-299317 A | 10/2003 |
| JP | 2003-324901 A | 11/2003 |
| JP | 2004-215353 A | 7/2004 |
| JP | 2004-236376 A | 8/2004 |
| JP | 2004-248402 A | 9/2004 |
| JP | 2004-297924 A | 10/2004 |
| JP | 2004-312886 A | 11/2004 |
| JP | 2004-357472 A | 12/2004 |
| JP | 2005-012989 A | 1/2005 |
| JP | 2005-057957 A | 3/2005 |
| JP | 2005-168265 A | 6/2005 |
| JP | 2006-060914 A | 3/2006 |
| JP | 2000-152561 A | 9/2006 |
| JP | 2006-297541 A | 11/2006 |
| JP | 2006-528879 A | 12/2006 |
| JP | 2007-282341 A | 10/2007 |
| JP | 2008-021950 A | 2/2008 |
| JP | 2008-206213 A | 9/2008 |
| JP | 2008-219960 A | 9/2008 |
| JP | 4187606 B2 | 11/2008 |
| JP | 2008-544733 A | 12/2008 |
| JP | 2009-247084 A | 10/2009 |
| JP | 2009-247085 A | 10/2009 |
| JP | 2009-254205 A | 10/2009 |
| JP | 2010-028908 A | 2/2010 |
| JP | 2010-028958 A | 2/2010 |
| JP | 2010-035265 A | 2/2010 |
| JP | 2010-063253 A | 3/2010 |
| JP | 2010-121701 A | 6/2010 |
| KR | 10-1997-0055103 A | 7/1997 |
| KR | 10-2000-0013908 A | 3/2000 |
| KR | 10-2006-0102496 A | 9/2006 |
| KR | 10-2007-0027809 A | 3/2007 |
| KR | 10-2009-0048028 A | 5/2009 |

OTHER PUBLICATIONS

International Search Report.
International Search Report completed May 24, 2012.
International Search Report completed Apr. 19, 2012.
International Search Report completed Apr. 9, 2012.
International Search Report completed Apr. 20, 2012.
International Search Report completed Mar. 8, 2012.
International Search Report completed Apr. 24, 2012.
WIPO Search Report and Written Opinion dated Oct. 29, 2012 for corresponding Application No. PCT/US2012/033915; 8 sheets.
WIPO Search Report and Written Opinion dated Nov. 14, 2012 for corresponding Application No. PCT/US2012/040794; 8 sheets.

* cited by examiner

ELECTRIC MACHINE COOLING SYSTEM AND METHOD

BACKGROUND

Hybrid vehicles offer an opportunity for vehicle drivers to engage in environmentally-conscious behavior because of hybrids' improved fuel economy and reduced emissions. Hybrid vehicles combine traditional internal combustion engines with an electro-mechanical transmission. Electric motors located within the electro-mechanical transmission provide energy to propel the vehicle, reducing the need for energy provided by the internal combustion engine, thereby increasing fuel economy and reducing emissions.

As with any electric machine, the hybrid transmission's electric machine rejects some energy in the form of heat. Efficient removal of heat from the electric motor can improve the lifespan of the electric machine as well as improve the electric machine's operating efficiency.

SUMMARY

Some embodiments of the invention provide an electric machine module including an electric machine including a stator with stator end turns and a housing including at least two removably-coupled frame members. Each of the at least two removably-coupled frame members can include an inner wall at least partially defining a machine cavity and is capable of partially enclosing the electric machine. Each of the at least two removably-coupled frame members can also include an outer wall and a coolant cavity defined between the inner wall and the outer wall. The coolant cavity can be positioned substantially around one of the stator end turns radially and substantially beside the one stator end turn axially.

Some embodiments of the invention provide an electric machine module including an electric machine including a rotor coupled to a rotor hub. Portions of the rotor hub can include finning. The electric machine module also includes a housing including a plurality of removably-coupled members. Each of the removably-coupled frame members can include an inner wall at least partially defining a machine cavity and capable of partially enclosing the electric machine. The inner wall can include finning to matingly engage the finning on the rotor hub.

Some embodiments of the invention provide a method for cooling an electric machine. The method can include providing the electric machine including a rotor, a stator circumscribing the rotor, and a rotor hub coupled to the rotor, where a surface of the rotor hub includes rotor hub finning. The method can also include providing a housing comprising a plurality of removably-coupled frame members each including an inner wall and an outer wall. The inner walls can define a machine cavity for at least partially housing the electric machine. The method can further include matingly engaging the rotor hub finning with inner wall finning on a wall surface of the inner walls, providing a coolant cavity between the inner walls and the outer walls, introducing a coolant into the coolant cavity, and circulating the coolant throughout the coolant cavity to remove heat energy from the electric machine.

DETAILED DESCRIPTION

Figure 1:
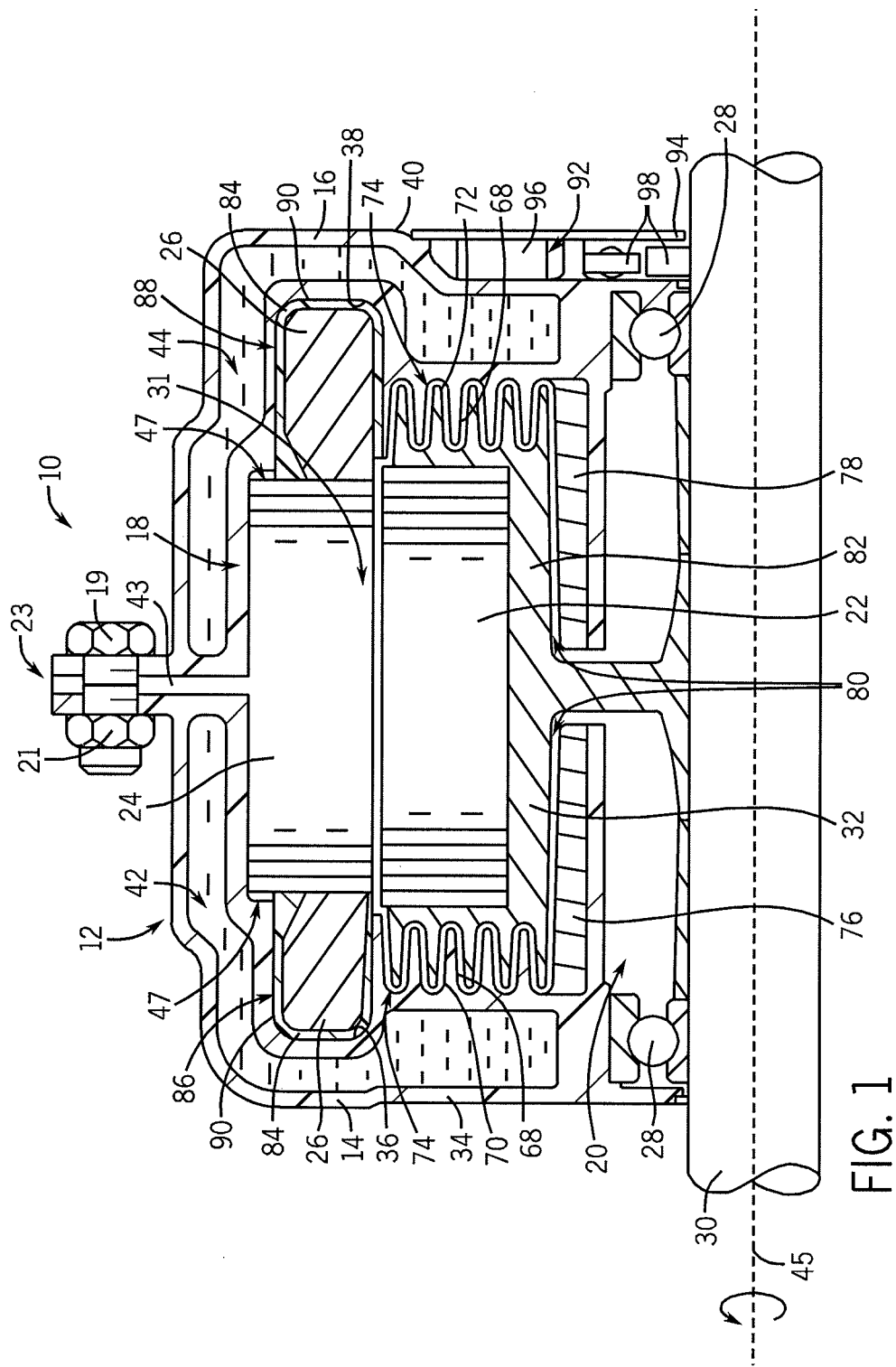
FIG. 1 is a partial front cross-sectional view of an electric machine module according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

FIG. 1 illustrates a portion of an electric machine module 10 according to one embodiment of the invention. The electric machine module 10 can include a housing 12 comprising two or more removably-coupled frame members, such as a twist end frame member 14 and a crown end frame member 16. An electric machine 18 can be housed within a machine cavity 20 at least partially defined by the removably-coupled frame members 14, 16. For example, the twist end frame member 14 and the crown end frame member 16 can be coupled via one or more bolts 19 and nuts 21 through a central lip 23 created by the removably-coupled frame members 14, 16, or another suitable coupling manner, to enclose the electric machine 18 within the machine cavity 20.

The electric machine 18 can include a rotor 22, a stator 24, stator end turns 26, and bearings 28, and can be disposed about a main output shaft 30. The stator 24 can circumscribe the rotor 22, and a radial air gap 31 can exist between the rotor 22 and the stator 24. In some embodiments, the electric machine 18 can also include a rotor hub 32 or can have a "hub-less" design (not shown). The electric machine 18 can be, without limitation, an electric motor, such as a hybrid electric motor, an electric generator, or a vehicle alternator. In one embodiment, as shown in FIG. 1, the electric machine 18 can be an induction belt-alternator-starter (BAS). In another embodiment, the electric machine 18 can be a High Voltage Hairpin (HVH) electric motor for use in a hybrid vehicle.

Components of the electric machine 18 such as, but not limited to, the stator end turns 26, the rotor 22, and the rotor hub 32 can generate heat during operation of the electric machine 18. These components can be cooled to enhance the performance of and increase the lifespan of the electric machine 18.

Figures 2A, 2B:
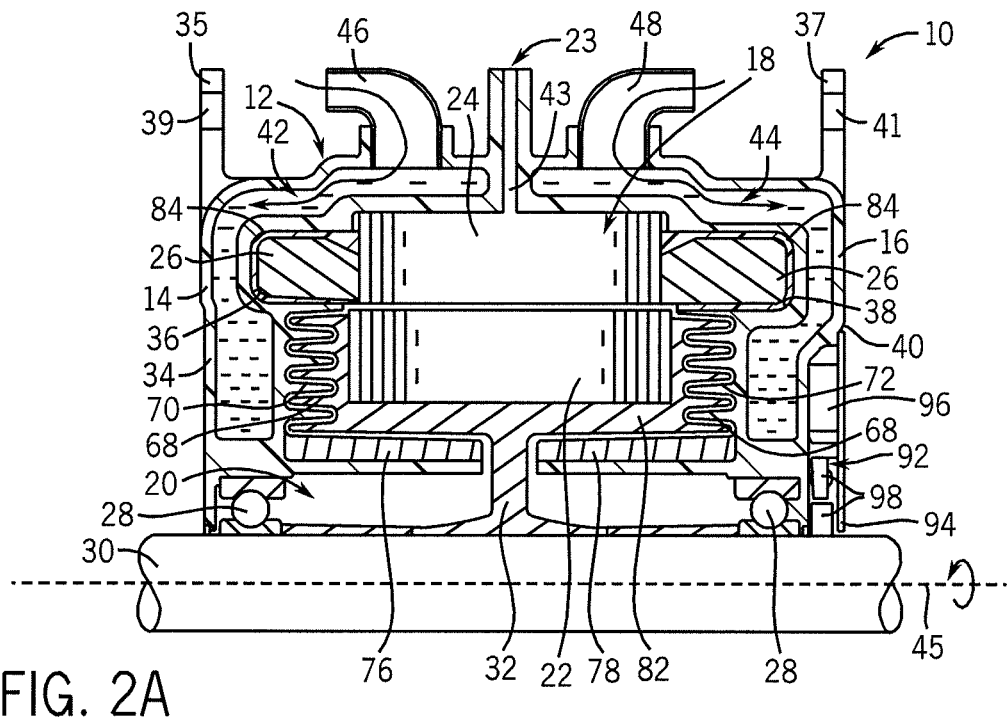
FIG. 2A is a partial front cross-sectional views of the electric machine module according to one embodiment of the invention.
FIG. 2B is a partial back cross-sectional view of the electric machine module according to one embodiment of the invention.

In some embodiments, as shown in FIG. 1, the twist end frame member 14 and the crown end frame member 16 can be similarly manufactured or substantially identical, generally providing two halves of the housing 12 split along the center lip 23. The frame members 14, 16 can be fabricated from materials such as aluminum, steel, stainless steel, etc. through processes such as lost foam casting, investment casting, etc. For example, in one embodiment the frame members 14, 16 can be fabricated from cast aluminum by lost foam casting. An outer wall 34 of the twist end frame member 14 can be configured to engage other machinery, such as a transmission body (not shown). An inner wall 36 of the twist end frame member 14 can be configured to receive the electric machine 18 within the machine cavity 20. In addition, the crown end frame member 16 can define an outer wall 38 and an inner wall 40 which can be configured to engage other machinery and to receive the electric machine 18 within the machine cavity 20, respectively. In some embodiments, the twist end frame member 14 and/or the crown end frame member 16 can include outer wall extensions 35, 37, respectively. The outer wall extensions 35, 37 can include holes 39, 41, as shown in FIGS. 1-2B. Conventional fasteners (not shown) can be used through the holes 39, 41 to couple the housing 12 to a transmission body.

The stator 24 can comprise a substantially solid stack of stator laminations. In some embodiments, the stator laminations can be uniform in radial length so that the stator lamination stack has a smooth outer diameter. In other embodiments, one or more stator laminations 43 (e.g., the centrally-located stator laminations, as shown in FIG. 1) can extend radially past the rest of the stator lamination stack. In one embodiment, the extended stator laminations 43 can extend upward through an entire length of the central lip 23 between the twist end frame member 14 and the crown end frame member 16, as shown in FIG. 1. As a result, the one or more bolts 19 and nuts 21 passing through the central lip 23 can also pass through the extended stator laminations 43 in order to couple the stator 24 to the housing 12. In another embodiment, the extended stator laminations 43 can extend upward into the central lip 23, but not through the entire length of the central lip 23.

The extended stator laminations 43 can provide a datum plane for stacking the components of the electric machine module 10 in the axial direction during assembly. The datum plane created by the extended stator laminations 43 can help tightly control axial positioning of the electric machine 18. In addition, the datum plane can be more truly perpendicular to a center axis of rotation 45 of the electric machine 18. As a result, the components can be aligned to the center axis 45 more truly compared to electric machine modules aligned using outer edges of the stator 24.

By locating the electric machine 18 within the housing 12 using the extended stator laminations 43 through the central lip 23, clearance gaps 47 can be provided between one or both axial ends of the stator 24 and the housing 12. Further, by coupling the extended stator laminations 43 to the housing 12 through the central lip 23, torque produced by the electric machine 18 can be transferred to the housing 12. By securing the electric machine 18 to the housing 12 using the stator 24, the torque transmission can be less dependent upon the press-fit between the housing 12 and the outer diameter of the stator 24.

Figure 3:
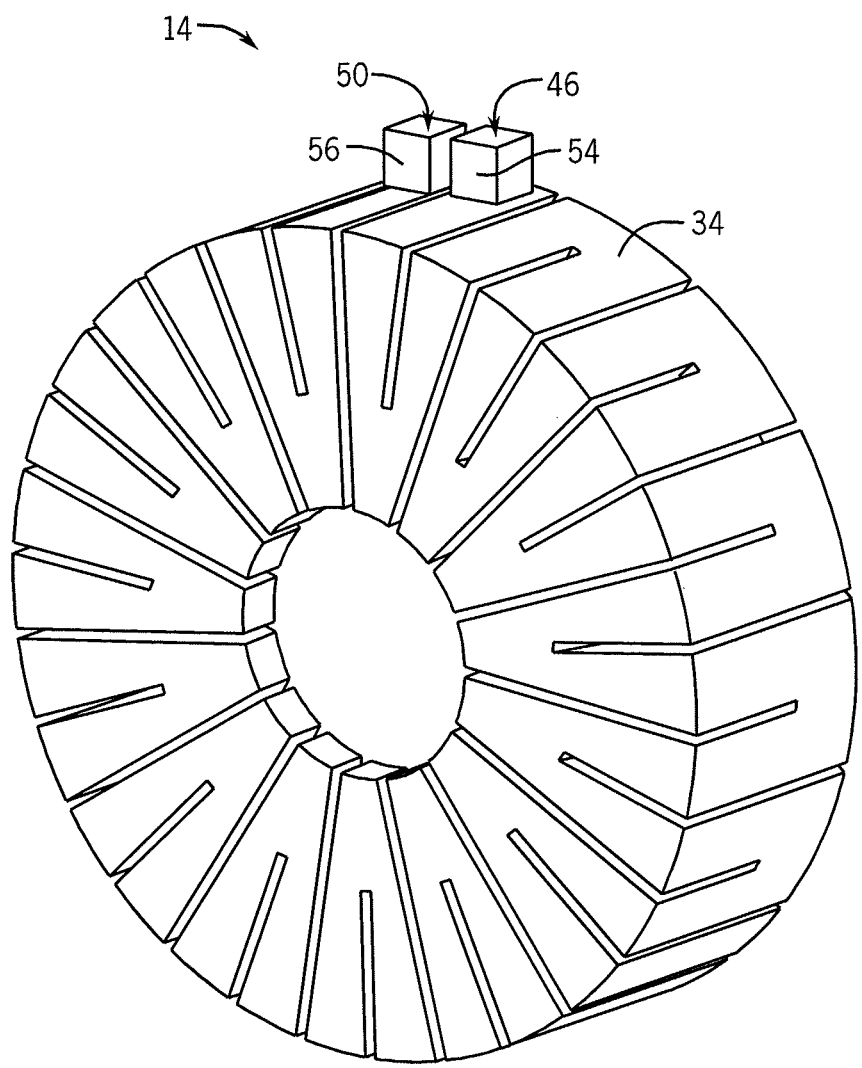
FIG. 3 is a perspective view of a frame member of the electric machine module of FIGS. 2A and 2B.

In some embodiments, coolant cavities 42, 44 can be positioned within the frame members 14, 16 (i.e., between the outer walls 34, 38 and the inner walls 36, 40). As shown in FIG. 1, each of the coolant cavities 42, 44 can be positioned both radially around the electric machine 18 (i.e., substantially circumscribing the stator 24) and axially adjacent to the electric machine 18 (i.e., along either side of the electric machine 18). The coolant cavities 42, 44 can be in fluid communication with a fluid source (not shown) via inlets 46, 48 and outlets 50, 52, which can be integral with the frame members 14, 16, respectively (as shown in FIGS. 2A, 2B, and 3). In some embodiments, as best shown in FIG. 3, the inlet 46 and the outlet 50 (and the inlet 48 and the outlet 52, not shown) can be housed in respective single bodies 54, 56. In one embodiment, the single bodies 54, 56 can be steel bodies press-fit to the outer walls 34, 38. An interface between the bodies 54, 56 and the outer walls 34, 38 can be sealed with a resin, such as epoxy.

In some embodiments, the twist end frame member 14 and the crown end frame member 16 can have substantially different axial lengths. As a result, the frame members 14, 16 can be coupled together at different axial lengths along the housing 12, for example, at a peripheral lip (not shown) created by the frame members 14, 16 as opposed to the central lip 23. In one embodiment, the twist end frame member 14 (or the crown end frame member 16) can extend across a majority of the axial length of the housing 12, substantially acting as a canister-type module at least partially surrounding the electric machine 18 and the crown end frame member 16 (or the twist end frame member 14) can act as a cap enclosing the canister-type module. In embodiments where the frame members 14, 16 have substantially different lengths, at least one of the coolant cavities 42 or 44 can be positioned both radially around the electric machine 18 and axially adjacent to the electric machine 18 and the other of the coolant cavities 42 or 44 can be positioned at least axially adjacent to the electric machine 18 (or both radially around the electric machine 18 and axially adjacent to the electric machine 18).

Figure 4A:
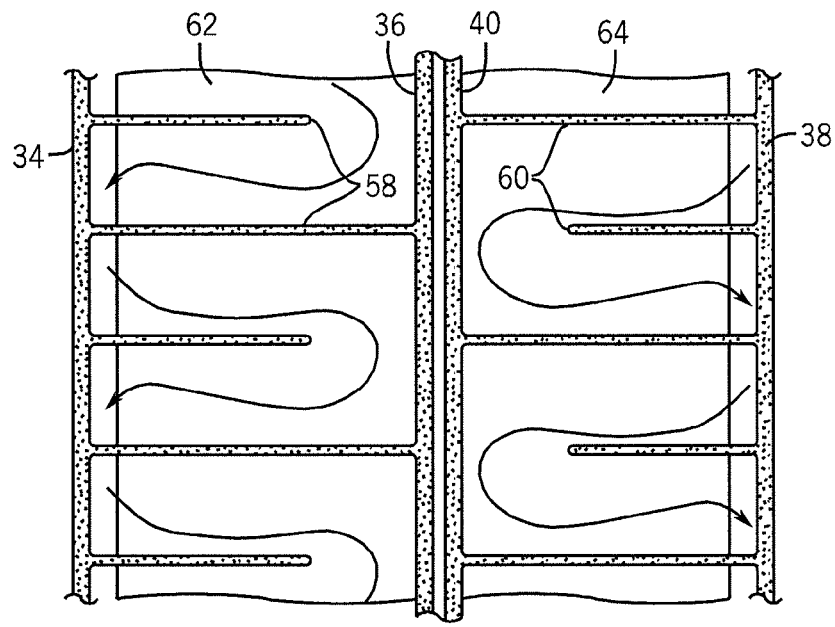
FIG. 4A is a partial side cross-sectional view of the electric machine module of FIG. 1.
Figure 4B:
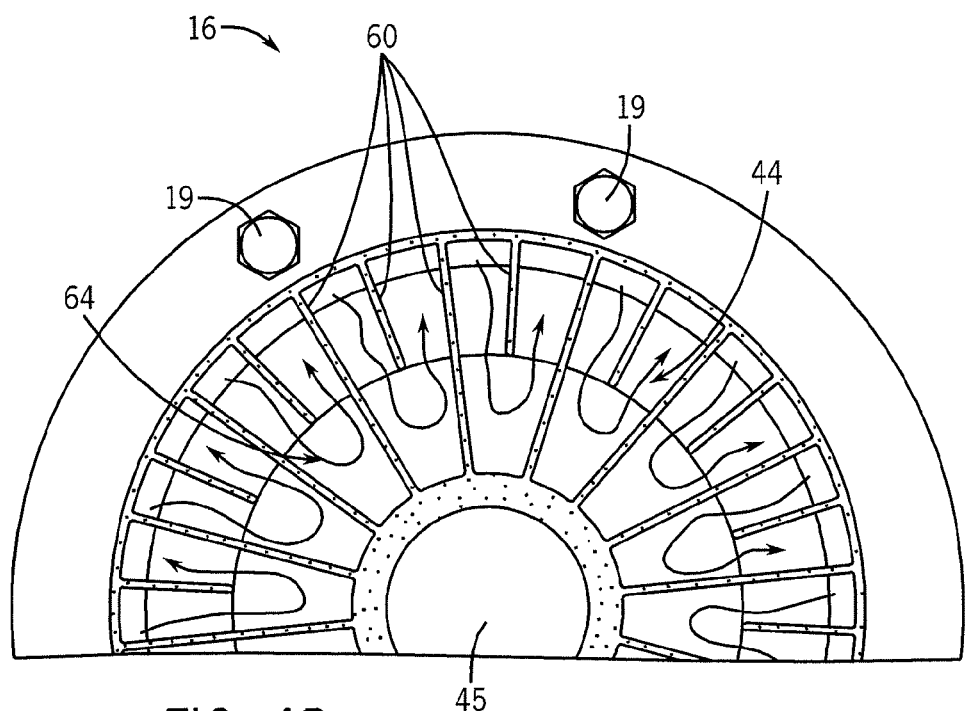
FIG. 4B is a partial side cross-sectional view of the electric machine module of FIG. 1.

As shown in FIGS. 3, 4A, and 4B, in some embodiments, an interior surface of the coolant cavities 42, 44 can include coolant cavity finning 58, 60. The coolant cavity finning 58, 60 can protrude into the coolant cavities 42, 44 in both radial and axial directions. The coolant cavity finning 58, 60 can be configured to form continuous channels 62, 64 in the coolant cavities 42, 44 which can receive a flowing coolant (indicated by arrows in FIGS. 4A and 4B). For example, the coolant can flow from the inlets 46, 48, through the continuous channels 62, 64, in a back and forth weaving pattern, to the outlets 50, 52. In other embodiments, the coolant cavity finning 58, 60 can protrude into the coolant cavities 42, 44 in the radial direction or in the axial direction. In yet other embodiments, the coolant cavities 42, 44 do not include the coolant cavity finning 58, 60 and coolant can flow straight from the inlets 46, 48 to the outlets 50, 52 without weaving back and forth.

By protruding into the coolant cavities 42, 44, the coolant cavity finning 58, 60 can provide more surface area to receive the coolant compared to a substantially planar surface, and thus, can allow more heat energy transfer from the electric machine 18 to the coolant and reduce thermal resistance. Further, by channeling the flow, rather than having a straight flow path, average flow velocity of the coolant can be increased, which can aid in heat transfer. In addition, the back and forth weaving pattern of the flow can force the coolant to turbulently scrub against surfaces of the coolant cavities 42, 44, further enhancing heat energy transfer from the electric machine 18 to the coolant. By splitting the flow path into two paths (i.e., a single, separate path in each of the frame members 14, 16), flow resistance can be reduced by about 25%, compared to electric machine modules with only a single flow path. The reduced flow resistance can allow more scrubbing of the coolant by the surfaces of the coolant cavities 42, 44 to further enhance cooling. Also, the coolant cavity finning 58, 60 can provide a conduction path from the inner walls 36, 40 to the outer walls 34, 38 so that heat from the electric machine 18 conducted to the inner walls 36, 40 can be conducted to the outer walls 34, 38. The outer walls 34, 38 can provide additional surface area to help remove the heat conducted from the electric machine 18.

In some embodiments, the coolant can be water, ethylene glycol, a mixture of water and ethylene glycol, motor oil, hydraulic fluid oil, antifreeze, or a similar fluid. The coolant can be pressurized when it enters the housing 12. After leaving the housing 12 via the outlets 50, 52, the coolant can flow toward a heat transfer element (not shown) outside of the housing 12 which can remove the heat energy received by the coolant. The heat transfer element can be a radiator or a similar heat exchanger device capable of removing heat energy.

As shown in FIG. 1, in some embodiments, the rotor hub 32 can include axial rotor hub finning 68. The axial rotor hub finning 68 can further increase heat energy dissipation from the electric machine 18 by providing additional surface area. The axial rotor hub finning 68 can be mounted to or integral with axial sides of the rotor hub 32 and can interface with the inner walls 36, 40 (e.g., in a substantially longitudinal manner). For example, the axial rotor hub finning 68 can be pressed onto the rotor 22. In one embodiment, the inner walls 36, 40 can include axial inner wall finning 70, 72 configured to interdigitate with or matingly engage the axial rotor hub finning 68. In one embodiment, an air cavity 74 can be defined between the axial inner wall finning 70, 72 and the axial rotor hub finning 68. In another embodiment, the axial inner wall finning 70, 72 and the axial rotor hub finning 68 can be in physical contact with each other and a lubricant can be used to reduce friction between them as the axial rotor hub finning 68 rotate.

Herein, the term matingly engage can refer to, but is not limited to, physical contact between engaging finning or no contact between engaging finning (e.g., separated by a lubricant or an air gap). Also, herein, the term interdigitate is not limited to alternating single digits of engaging finning, but can refer to alternating double digits of engaging finning, alternating single and double digits of engaging finning, etc.

During operation of the electric machine 18, the mating interaction between the axial rotor hub finning 68 and the axial inner wall finning 70, 72 can provide increased heat energy transfer between the rotating rotor 22 and rotor hub 32 and the stationary inner walls 36, 40 because of the relatively large surface area created by these features, compared to conventional electric machine modules. After transferring from the axial rotor hub finning 68 to the axial inner wall finning 70, 72, heat energy can be transferred to the coolant cavity finning 58, 60 (i.e., through the inner walls 36, 40). From the coolant cavity finning 58, 60, heat energy can be transferred to the circulating coolant. The coolant can then flow through the outlets 50, 52 toward the heat transfer element. In addition, some heat energy can be dissipated within the air cavity 74, due to a relatively high convection coefficient present in that area as a result of the relatively small air cavity 74 and the rotating rotor hub 32.

Figure 5A:
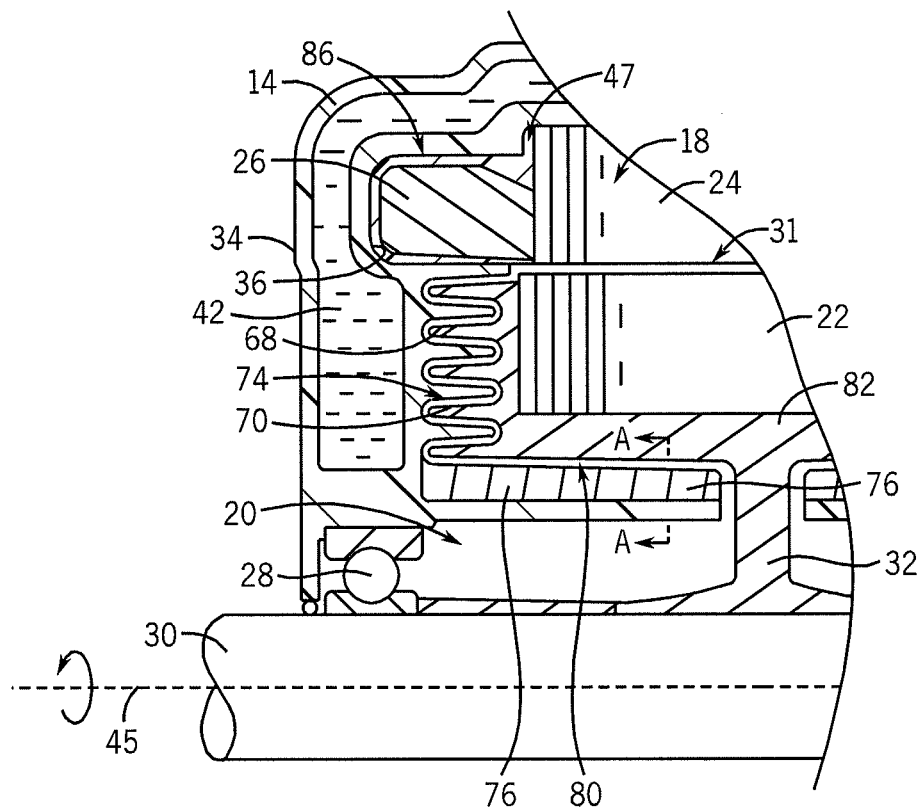
FIG. 5A is a partial front cross-sectional view of the electric machine module.
Figure 5B:
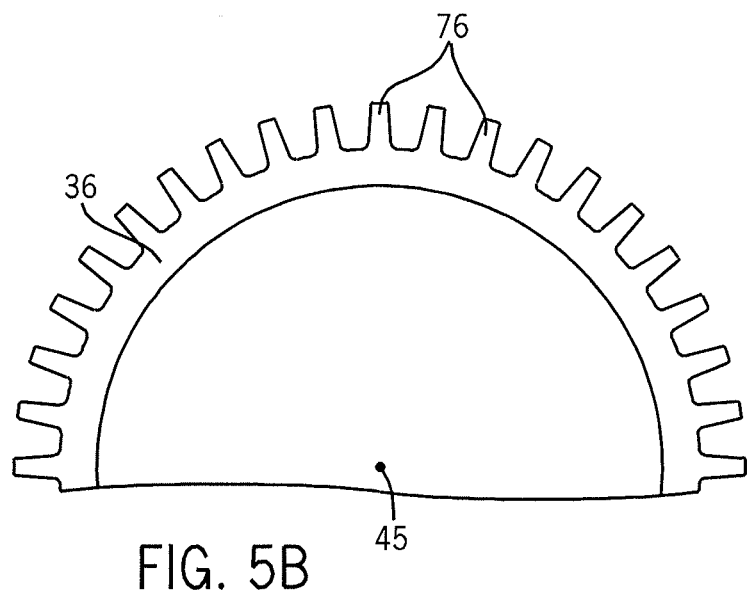
FIG. 5B is a cross-sectional view of a inner wall of the electric machine module along section A-A of FIG. 5A

In some embodiments, as shown in FIGS. 5A and 5B, radial inner wall finning 76, 78 can be mounted along, or integral with, the inner walls 36, 40 near an inner radial portion of the rotor hub 32 (i.e., near an inner diameter of the rotor hub 32). Compared to conventional electric machine modules, heat energy transfer can occur more efficiently between the rotor hub 32 and the radial inner wall finning 76, 78 because of the additional surface area provided by the radial inner wall finning 76, 78. The radial inner wall finning 76, 78 can provide additional surface area for heat transfer from the rotor hub 32 through an air gap 80 in the machine cavity 20 to the inner walls 36, 40. Some heat energy can be dissipated from the air gap 80 throughout the machine cavity 20 and other heat energy can be transferred through the inner walls 36, 40 to the coolant cavities 42, 44, where it can be transferred to the coolant and later removed by the heat transfer element. In addition, some heat energy can be dissipated within the air gap 80, due to a relatively high convection coefficient present in that area as a result of the relatively small air gap 80 and the rotating rotor hub 32.

Figure 6:
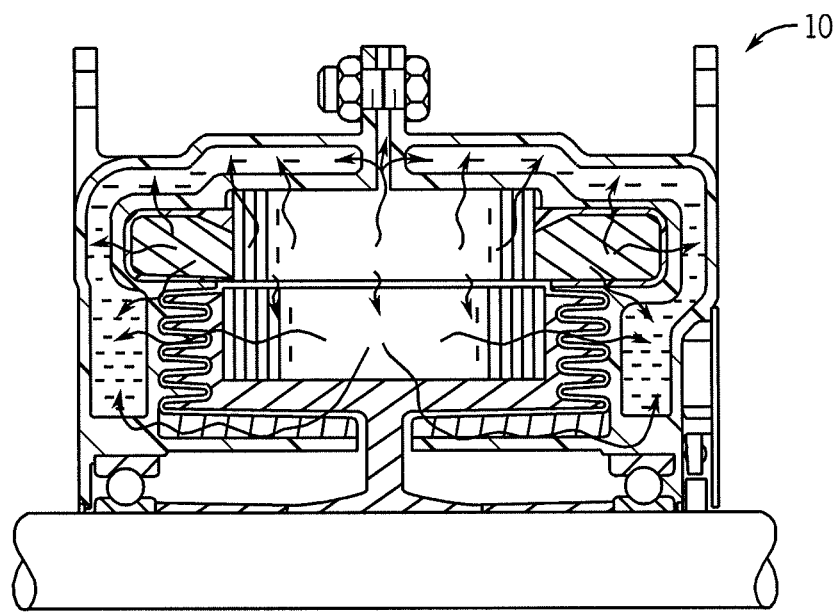
FIG. 6 is a cross-sectional view illustrating heat dissipation throughout the electric machine module of FIG. 1, according to one embodiment of the invention.

As described above, the frame members 14, 16 can provide a liquid-cooled housing 12 surrounding the electric machine 18 both radially and axially so that the coolant can be brought into close proximity of the heat-generating components of the electric machine 18. In addition, the radial inner wall finning 76, 78 can help surround the stator end turns 26 on three sides (i.e., axial outer, radially inner, and radial outer) with the liquid-cooled housing 12. By minimizing the distance from the heat-generating components to the coolant, thermal resistance can be reduced, and thus, cooling can be enhanced. For example, FIG. 6 illustrates flow paths of heat energy from the electric machine 18 to the coolant.

In some embodiments, the rotor hub 32 can include a base 82 that is thicker than conventional rotor hub bases. The thicker rotor hub base 82 can aid in axial and radial conduction of heat energy away from the rotor 22.

In some embodiments, as shown in FIG. 1, the stator end turns 26 can be potted in a potting material 84. The potting material 84 can be an epoxy resin or a similar material. The inner walls 36, 40 can be configured to define thermal cavities 86, 88 to receive the potted stator end turns 26. For example, the stator end turns 26 can be potted in a mold prior to being inserted into the machine cavity 20. The mold can be shaped so that it forms a cavity around the stator end turns 26 similar in shape to the thermal cavities 86, 88.

In one embodiment, a thermally-conductive material 90 can fill the any air gaps in the thermal cavities 86, 88 between the potted stator end turns 26 and the inner walls 36, 40. The thermally-conductive material 90 can increase heat energy dissipation across the thermal cavities 86, 88 (i.e., compared to dissipating heat energy across the air gaps). The thermally-conductive material 90 can be a compound capable of conducting heat energy, such as thermal grease, a thermal paste, or a similar material. Heat energy can be transferred from the potted stator end turns 26 through the thermally-conductive material 90, to the inner walls 36, 40. Heat energy can then be transferred through the coolant cavity finning 58, 60 to the coolant and can be removed from the housing 12 via the coolant exiting the outlets 50, 52.

In one embodiment, the two frame members 14, 16 can be stepped inward near the stator end turns 26 to reduce the size of the thermal cavities 86, 88, and thus, reduce the thickness of the potting material that the heat energy from the stator end turns 26 must travel through to reach the inner walls 36, 40. In addition, by potting the stator end turns 26 in an external mold and then using the thermally-conduct material 90 to fill the void between the stator end turns 26 and the frame members 14, 16, as opposed to potting the stator end turns 26 inside the frame members 14, 16, the electric machine 18 is capable of being disassembled from the frame members 14, 16 for future services, repair, etc. Also, because the stator end turns 26 are potted in an external mold, the housing 12 can comprise the two separate frame members 14, 16 each able to surround the electric machine 18 axially and radially, whereas conventional housings must be configured otherwise so that the inserted stator end turns 26 can be accessed by the potting material.

In some embodiments, the housing 12 including the two frame members 14, 16 can require fewer fasteners than some conventional machine housing designs. For example, the two frame members 14, 16 can be coupled together at a single joint (i.e., the central lip 23) compared to housings requiring two separate joints for assembly. In addition, the two frame members 14, 16 can be substantially stronger than conventional machine housing elements and can better maintain alignment of the electric machine 18 as described above, and thus, do not require any angular span between fasteners. In addition, the central lip 23 can provide more radial space for larger bolts or fasteners to be used. The larger bolts can provide greater clamp pressure compared to smaller fasteners used in conventional structures which are often limited to the thickness of the housing.

In some embodiments, the crown end frame member 16 can include a recess 92 located in a region of the outer wall 38. Electrical components can be located within this recess 92, such as a terminal block 96, a position sensor 98, etc., as shown in FIGS. 1, 2A-2B, and 6. As a result of storing the components in the recess 92, an added axial length of the housing 12, which is often undesirable in many applications, is not necessary. A cover plate 94 can be removably coupled to the outer wall 38 enclosing the recess 92 in order to secure the electrical components within the recess 92. In some embodiments, the position sensor 98 can be a angular position sensor for the electric machine 18 and can be located with in the recess 92 outside of the machine cavity 20 (as shown in FIG. 1) or inside the machine cavity 20 (not shown). The position sensor 98 being located outside the machine cavity 20 can allow more accessibility for service, maintenance, or other purposes.

Figure 7:
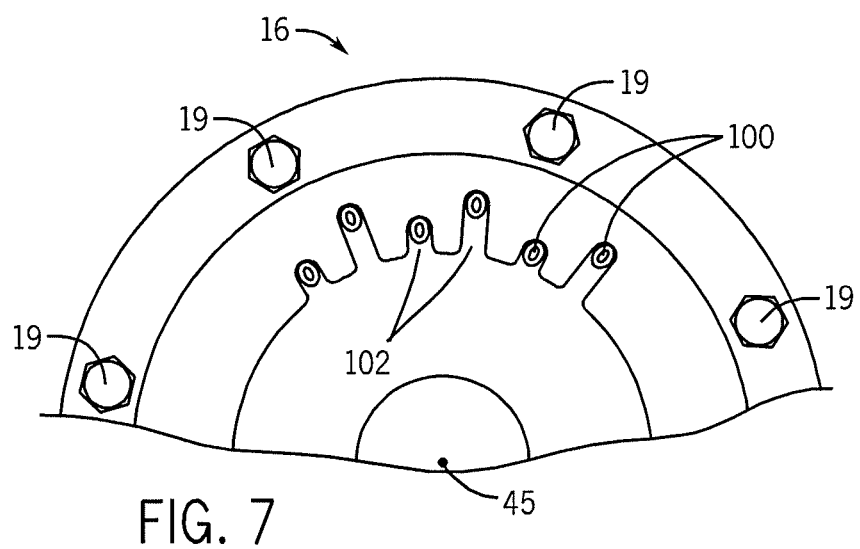
FIG. 7 is a perspective view of a frame member of the electric machine module of FIG. 1.

In addition, in some embodiments, the terminal block 96 can be a molded plastic terminal block which can connect stator phase leads 100 to outside wiring connections via copper terminals. The stator phase leads 100 can be copper conductor phase leads from the stator 24. The terminal block 96 can be configured to connect to the outside wiring connections in an axial or radial manner. As shown in FIG. 7, the crown end frame member 16 can further include channels 102 to accommodate the stator phase leads 100. In one embodiment, during casting of the crown end frame member 16, the outer wall 38 can be sunken in to a depth of the inner wall 40 to create the channels 102.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. An electric machine module comprising:
an electric machine including a rotor and a stator with stator end turns; the stator circumscribing at least a portion of the rotor;
a rotor hub coupled to the rotor, the surface of the rotor hub integrally including a plurality of axial fins on both axial sides of the rotor hub;
a housing including at least two removably-coupled frame members, each of the at least two removably-coupled frame members including
an inner wall at least partially defining a machine cavity and capable of partially enclosing the electric machine, and
an outer wall;
coolant cavities defined between the inner wall and the outer wall of each of the at least two removably-coupled frame members,
each coolant cavity positioned substantially around a stator end turn radially and substantially beside a stator end turn axially and substantially beside at least a portion of the rotor radially; and
wherein each coolant cavity defines a single and separate flow path in each of the at least two removably-coupled frame members.

2. The electric machine module of claim 1, wherein the axial fins are positioned to extend substantially axially into the coolant cavity.

3. The electric machine module of claim 1, wherein a surface of the inner wall includes finning.

4. The electric machine module of claim 3, wherein the axial fins matingly engage the fuming on the surface of the inner wall.

5. The electric machine module of claim 1, wherein an area of the outer wall defines a recess enclosed by a removably-coupled cover plate.

6. The electric machine module of claim 1, wherein the stator end turns are potted in a potting material.

7. The electric machine module of claim 6, wherein the potted end turns and the inner wall define a thermal cavity, the thermal cavity includes a thermally-conductive material.

8. The electric machine module of claim 1, wherein each of the plurality of removably-coupled frame members further comprises an inlet and an outlet in fluid communication with the coolant cavity.

9. The electric machine module of claim 8, wherein a coolant is dispersed from the inlet through the coolant cavity to the outlet to cool the electric machine.

10. A method for cooling an electric machine comprising:
providing the electric machine including a rotor, a stator with stator end turns; the stator circumscribing at least a portion of the rotor;

providing a rotor hub coupled to the rotor, a surface of the rotor hub including rotor hub finning; wherein the rotor hub finning includes a plurality of integral axial hub fins on both axial sides of the rotor hub;

providing a housing comprising a plurality of removably-coupled frame members each including an inner wall and an outer wall, the inner walls defining a machine cavity for at least partially housing the electric machine and including inner wall finning; and providing coolant cavities defined between the inner wall and the outer wall of each of the at least two removably-coupled frame members, each coolant cavity positioned substantially around a stator end turn radially and substantially beside a stator end turn axially and substantially beside at least a portion of the rotor radially; and wherein each coolant cavity defines a single and separate flow path in each of the at least two removably-coupled frame members;

matingly engaging the rotor hub finning with inner wall finning;

providing a coolant cavity between the inner walls and the outer walls;

introducing a coolant into the coolant cavity; and circulating the coolant throughout the coolant cavity to remove heat energy from the electric machine.

11. The method of claim 10 and further comprising pressurizing the coolant before introducing it into the coolant cavity.

12. The method of claim 10 wherein the stator end turns are potted in a potting material.

13. The method of claim 10 and further comprising pressurizing the coolant before introducing it into the coolant cavity.

14. The electric machine module of claim 10, wherein a surface of the inner wall includes finning.

15. The electric machine module of claim 10, wherein an area of the outer wall defines a recess enclosed by a removably-coupled cover plate.

16. The electric machine module of claim 10, wherein each of the plurality of removably-coupled frame members further comprises an inlet and an outlet in fluid communication with its own coolant cavity.

17. The electric machine module of claim 16, wherein each coolant cavity is configured and arranged to intake coolant from the inlet and disperse coolant from the outlet to cool the electric machine.

\* \* \* \* \*